June 22, 1965 — A. H. NELSON — 3,191,121

BISTABLE CURRENT REVERSING SWITCH
FOR FREQUENCY DETERMINATION
Filed Oct. 17, 1960

INVENTOR.
ALAN H. NELSON

BY John A Duffy

AGENT 3,191,121

BISTABLE CURRENT REVERSING SWITCH FOR FREQUENCY DETERMINATION

Alan H. Nelson, Long Beach, Calif., assignor to North American Aviation, Inc.

Filed Oct. 17, 1960, Ser. No. 63,185
2 Claims. (Cl. 324—79)

Figure 2:
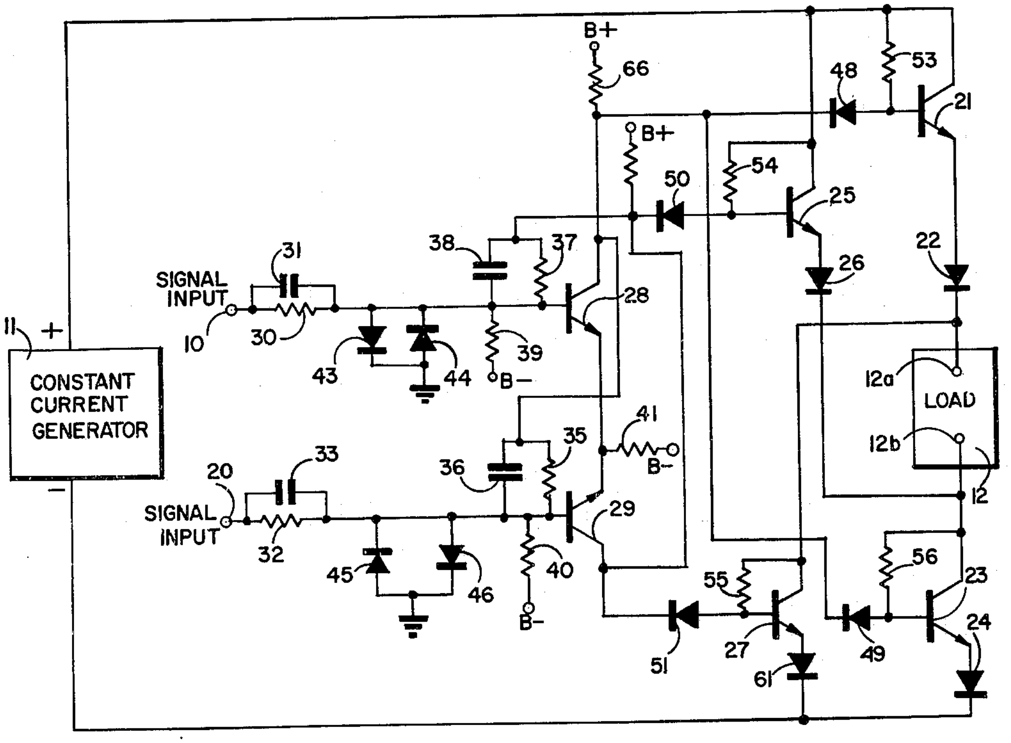

This invention relates to current reversing devices and more particularly to a circuit for producing a direct-current analogue signal indicative of the algebraic sum of rates of a pair of incremental pulse signals.

Systems controlled by computers sometimes obtain information in the nature of incremental rate voltage signals at the output of a digital computer. These signals are often in the form of constant amplitude pulse signals whose rate is directly proportional to the information received from the computer. In order to properly utilize this information, it becomes necessary to convert the incremental signals to a direct-current analogue signal such as may be utilized to drive a torquing motor of a gyro. The analogue signal is then proportional to the algebraic sum of the incremental rates of the input signals. It is often essential in the rate converter to provide accuracy of high precision whereby current losses in the rate converter are maintained at a minimum to produce an accurate analogue signal. Also, the rate converter must be capable of reliable operation and to receive incremental rate signals at high speeds.

Devices of the prior art for converting a pair of opposite polarity incremental rate signals from a digital computer into a direct-current analogue signal have utilized some type of double pole, double throw switch. Such switches, which may be solenoid operated to form a relay, are accurate in that no current loss occurs in the switch but are of very poor reliability being unable to accommodate high speed switching. Additionally, relay operated switches are bulky, power consuming and too heavy to meet requirements. Devices in the prior art utilizing electrical switching means have been severely limited in high speed operation, ability to handle large amounts of power, and ability to prevent leakage errors. Accordingly, it is an object of this invention to provide an improved circuit for converting digital signals to analogue signals.

The device of this invention contemplates as a material feature thereof a switching circuit for converting and amplifying a pair of rate incremental pulse signals received from a digital computer to an analogue direct-current signal which is the algebraic sum of the pulse rate. Accuracy is obtained by utilizing transistorized circuitry including diodes to provide a substantially zero impedance switch between a constant current generator and a constant impedance load. A transistorized multivibrator circuit is connected in a circuit to provide high speed operation and gain, so that the average current flowing in the output is a highly accurate measurement of the algebraic sum of a pair of opposite polarity high speed incremental rate signals from a digital computer. Additionally, current paths of minimum impedance are provided between the constant current generator and the constant impedance load to thereby handle currents of comparatively large magnitude.

It is therefore another object of this invention to provide a transistorized circuit for converting and amplifying incremental signals of high rate to analogue signals.

It is another object of this invention to provide a converter for computing the algebraic sum of the pulse rates of a pair of incremental pulse signals of high frequency with substantially zero leakage current.

Figure 1:
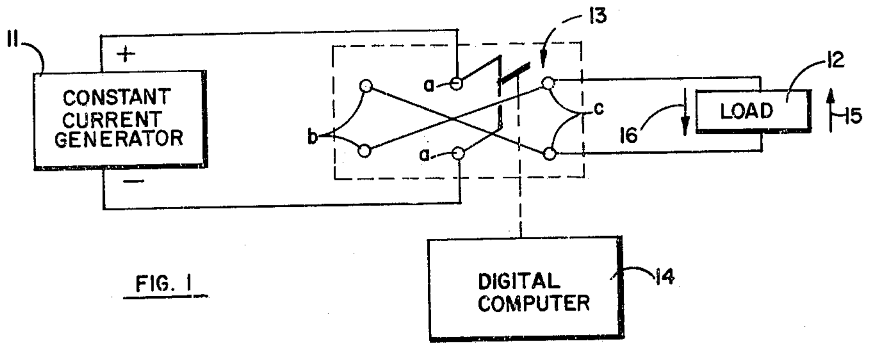

Other objects of invention will become apparent from the following description read with the accompanying drawings in which:

FIG. 1 is a simplified illustration in block form of the functional operation of the switch of this invention, and FIG. 2 is a schematic diagram illustrating an operable embodiment of the current reversing switch of this invention.

Referring now to FIG. 1, a block diagram illustrating the functional operation of the current reversing switch of the invention, a constant current generator 11 is connected through a double pole, double throw switch 13 to supply current to a constant impedance load 12 through a pair of paths of opposite direction as shown by the arrows. The switch 13 may be connected to be responsive to a digital computer 14 and operates so that the contacts *a* of the switch are in electrical contact with the contacts *b* upon receipt of incremental rate signals of a positive polarity from the computer 14 and the contacts *a* are in electrical contact with the contacts *c* upon receipt of signals of a negative polarity from the computer 14. When the switch is in the position wherein contacts *a* touch contacts *b*, current is supplied from the generator 11 to the load 12 through a path indicated by the arrow 15 and conversely when contacts *a* are in position with contacts *c*, current is supplied through a path indicated by the arrow 16. Load 12, which may comprise a suitable measuring means having a constant impedance, measures the average current flowing through the opposite paths indicated by the arrows 15 and 16 and thereby indicates the algebraic sum of the rate of pulse signals received by the switch 13 from the digital computer 14.

Referring now to FIG. 2, there is shown an operable embodiment of the invention which operates to convert and amplify the incremental rate signals from the computer 14 of FIG. 1 into an analogue signal indicative of the algebraic sum thereof. In FIG. 2, the constant current generator 11 has one side (illustrated as the plus side) connected through a transistor 21 and a diode 22 to one side 12*a* of the load 12. The other side 12*b* is connected through a transistor 23 and a diode 24 to the other side (minus side) of the generator 11. In this manner an electrical path is provided from the constant current generator 11 through the load 12 in the direction of 12*a* to 12*b*. A second electrical path through the load 12 in an opposite direction is provided by a circuit comprising a transistor 25 and a diode 26 connecting the plus side of generator 11 to the side 12*b* with the side 12*a* connected through a transistor 27 and a diode 61 to the minus side of generator 11. A path is thereby provided from the generator 11 through the load 12 in a direction from 12*b* to 12*a* which is opposite to the direction provided by the first path. The transistors 21 and 23 operate as a pair of gates serially connnected across the current generator 11 in the first electrical path and the transistors 25 and 27 also operate as a pair of gates serially connected across the generator 11 in the second electrical path to provide current flow in an opposite direction through the load 12.

The gates 21, 23, 25, and 27 are controlled by a bistable multivibrator comprising transistors 28 and 29. The transistor 28 receives an input at its base from an input terminal 10 through the coupling circuit of a resistor 30 and a capacitor 31. The input terminal 10 receives incremental rate-type pulse signals from the computer 14 in FIG. 1 indicative of a positive polarity. Similarly, the transistor 29 receives incremental rate input signals from the input terminal 20 at its base through the coupling circuit of resistor 32 and capacitor 33. For bistable multivibrator operation the output of the transistor 28 at its collector is coupled to the input of the transistor 29 at its base by a coupling circuit comprising the resistor 35 and capacitor 36 and the output of the transistor 29 at its collector is coupled to the input of transistor 28 at its base through a coupling circuit comprising the resistor 37 and the capacitor 38. An input pulse signal from the terminal 10 causes the transistor 28 to conduct which in turn cuts off the transistor 29 and an input signal from the terminal 20 causes transistor 29 to conduct which in turn cuts off the transistor 28. Resistors 39 and 40 respectively couple the bases of the transistors 28 and 29 to a B— operating potential to provide bistable stability. The emitters of the transistors 28 and 29 are connected in common through an emitter limiting resistor 41 to a B— terminal and the collector of transistor 28 is connected through a resistor 66 to a B+ terminal.

The multivibrator of the transistors 28 and 29 is operable at high speed by being connected in a circuit whereby neither transistor 28 or 29 reaches a saturation condition in either direction during operation. To accomplish this function the base of the transistor 28 is clamped within negative and positive limits by the diodes 43 and 44 connected between the base and ground. Similarly, the transistor 29 has diodes 45 and 46 connecting the base to ground for clamping the base to positive and negative voltage limits. In this manner, the transistors 28 and 29 form a non-saturating regenerative driver acting as a bistable multivibrator.

The multivibrator, in the state wherein transistor 28 is conducting and transistor 29 is cut off, operates to close the gates through the transistors 21 and 23 and to open the gates through the transistors 25 and 27. The collector of the transistor 28 is coupled through a diode 48 to the base of the transistor 21 and through a diode 49 to the base of transistor 23. The collector of the transistor 29 is coupled through a diode 50 to the base of the transistor 25 and through a diode 51 to the base of the transistor 27. Resistors 53, 54, 55, and 56 are connected respectively between the collector and bases of the transistors 21, 25, 27, and 23 to establish proper operating potentials between the base and collector of the transistors. The value of the resistors is selected so as to establish the impedance of the transistors, when conducting, at a minimum. In this manner, when transistors 21 and 23, for example, are conducting, the current path from the plus side of generator 11 through the transistor 21, the diode 22, the load 12, from 12*a* to 12*b*, the transistor 23, and the diode 24 has a minimum impedance. Because of the low impedance without the necessity of providing resistors in the path, high current levels may be utilized. Similarly, the opposite current path flow through the load 12 comprising the transistors 25 and 27 has a low impedance to the flow of current.

In order to prevent leakage current from entering the conducting current paths, diodes, preferably of a silocon junction type, are utilized to prevent current flow in the non-conducting current paths. For example, when the current path comprising the transistors 21 and 23 is conducting, the diode 48 prevents leakage current from flowing through the base-emitter circuit of the conducting transistor 21, the diode 49 prevents current from flowing through the base emitter circuit of the conducting transistor 23, the diode 26 prevents leakage current from flowing out of the load into the emitter of the non-conducting transistor 25, and the diode 61 prevents current from flowing into the emitter of the non-conducting transistor 27. Similarly, when the current path including the transistors 25 and 27 is actuated, the diode 50 prevents current from flowing through the base-emitter of conducting transistor 25, the diode 51 prevents current from flowing into base-emitter of the conducting transistor 27, the diode 22 prevents current from flowing into the emitter circuit of the non-conducting transistor 21, and the diode 24 prevents current from flowing into the emitter of the non-conducting transistor 23. In this manner, current from the constant current generator 11 is maintained almost exactly equal to the current flowing through the constant impedance load 12 with no current loss in the switching circuits.

In operation, input signals of a positive polarity received from the digital computer 14 of FIG. 1, at the input terminal 10 cause the transistor 28 to conduct which in turn cuts off the transistor 29 of the multivibrator. The output of the conducting transistor 28, which is the positive input signal amplified, cuts off transistors 21 and 23. The output of the transistor 29 coupled to the bases, causes conduction and amplification transistors 25 and 27 thereby creating a current path consisting of the plus side of the generator 11, the collector emitter of the transistor 25, the diode 26, the load 12 from the terminal 12*b* to the terminal 12*a*, the collector emitter of the transistor 27, the diode 61, and the minus side of the generator 11.

An input signal of negative polarity received at the terminal 20 causes the multivibrator to return to the state wherein the transistor 29 is conducting and the transistor 28 is cut off. The transistors 25 and 27 are cut off by the output of the transistor 29 which is the negative input signal amplified, and transistors 21 and 23 are conducting and amplifying by reason of the signal received from the output of the cut off transistor 28. A current path of opposite direction is now created consisting of the plus side of the generator 11, the collector emitter of the transistor 21, the diode 22, the load 12 from the terminal 12*a* to 12*b*, the collector emitter of the transistor 23, the diode 24 and the minus side of the generator 11. The current flowing through the constant impedance load 12 is equal to the algebraic sum of the rate of input signals received at the input terminals 10 and 20.

The exact value of the components and operating potentials are a matter of design, depending on the desired current and voltages. In an operable embodiment successfully tested, the constant current generator 11 had a +40 voltage at its plus side, and a +10 voltage at its minus side, the B+ terminal was equal to +50 volts, the B— terminal was equal to —25 volts, and the ground terminal was equal to 0 volts. The current through each of the opposite direction current paths was substantially equal to 18 milliamps with errors caused from leakage current equal to approximately .001% of the output current. The minimization of the switching times between current paths reduced the errors contributed by switching transients to not more than .005%. The unbalance in the switching impedances, that is, the difference in impedance between the two current paths was typically on the order of 5%. The impedance of the source constant current generator 11 was selected to be sufficiently high to minimize and almost completely compensate for this error.

The load 12 may comprise a measuring system such as a recorder for measuring average D.-C. current. The transistors are shown in the embodiment of FIG. 2 as NPN transistors, it being realized that it would be obvious to one skilled in the art to substitute PNP transistors with the operating potentials changed to be compatible therewith.

The device as shown in FIG. 2 operates as a bistable multivibrator being switched from one state to the other by signals of opposite polarity from the input terminals 10 and 20 respectively. Removal of the biasing resistors 39 and 40 will produce a multivibrator of indeterminate astable state being switched by signals from input terminals 10 or 20.

The device of this invention has particular application for the conversion of binary incremental digital computer outputs into precision torquing currents to drive gyro and distant meter motors. The incremental digital computer outputs of opposite polarity are presented to the input terminals 10 and 20 and converted in load 12 to an analogue signal indicative of the algebraic sum of the input signals.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Frequency determining means comprising separate input means connected to be responsive to first and second pulse trains respectively indicative of an incremental rate, a bistable multivibrator, one of the stages of said multivibrator being responsively connected to one of said input means to be switched by said first pulse train, the other stage of said multivibrator being responsively connected to the other of said input means to be switched by said second pulse train, a load, a constant current generating means, a first transistor and diode connected in series between one side of said generator and one side of said load to form a first electrical path, a second transistor and diode connected in series between said one side of said generator and the other side of said load to form a second electrical path, a third transistor and diode conected in series between said one side of said load and the other side of said generator to form a third electrical path, and a fourth transistor and diode connected in series between said other side of said load and said other side of said generator to form a fourth electrical path, said first and fourth transistors coupled to said multivibrator to be conductive when said one stage of said multivibrator is switched by said first pulse train, said second and third transistors coupled to said multivibrator to be conductive when said other stage of said multivibrator is switched by said second pulse train.

2. Frequency determining means comprising:

separate input means, connected to be responsive to first and second pulse trains, respectively, indicative of an incremental rate;

a bistable multivibrator, one of the stages of said multivibrator being responsively connected to one of said input means to be switched by said first pulse train, the other stage of said multivibrator being responsively connected to the other of said input means to be switched by said second pulse train;

means for clamping the control electrodes of said multivibrator stages to predetermined positive and negative voltage limits to prevent saturation of said stages;

a load;

a constant current generating means;

a first transistor and diode connected in series between a first terminal of said generator and a first terminal of said load to form a first electrical path;

a second transistor and diode connected in series between said first terminal of said generator and a second terminal of said load to form a second electrical path;

a third transistor and diode connected in series between said first terminal of said load and the second terminal of said generator to form a third electrical path;

a fourth transistor and diode connected in series between said second terminal of said load and said second terminal of said generator to form a fourth electrical path;

said first and fourth transistors coupled to said multivibrator to lie conductive when said one stage of said multivibrator is switched by said first pulse train;

said second and third transistors coupled to said multivibrator to be conductive when said other stage of said multivibrator is switched by said second pulse train.

References Cited by the Examiner

UNITED STATES PATENTS

| | | | |
|---|---|---|---|
| 2,820,140 | 1/58 | Rajchman | 235—154 |
| 2,858,425 | 10/58 | Gordon. | |
| 2,892,103 | 6/59 | Scarborough | 307—88.5 |
| 2,954,165 | 9/60 | Myers | 235—154 |
| 2,959,689 | 11/60 | Gilbert | 307—88.5 |
| 2,970,308 | 1/61 | Stringfellow et al. | 235—151 |
| 3,000,070 | 11/61 | Barnes | 307—88.5 |
| 3,038,130 | 6/62 | Gordon | 307—88.5 |

WALTER L. CARLSON, *Primary Examiner.*

C. D. ANGEL, *Examiner.*